United States Patent [19]

(12) United States Patent
Katsuda

(10) Patent No.: US 9,086,540 B2
(45) Date of Patent: Jul. 21, 2015

(54) IMAGING APPARATUS AND CONTROL METHOD OF IMAGING APPARATUS

(75) Inventor: Yasutoshi Katsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 13/569,652

(22) Filed: Aug. 8, 2012

(65) Prior Publication Data

US 2013/0077946 A1 Mar. 28, 2013

(30) Foreign Application Priority Data

Sep. 22, 2011 (JP) ................. 2011-206817

(51) Int. Cl.
*H04N 5/232* (2006.01)
*G03B 13/20* (2006.01)
*G02B 7/28* (2006.01)
*G03B 15/05* (2006.01)
*H04N 5/235* (2006.01)

(52) U.S. Cl.
CPC ........ *G02B 7/28* (2013.01); *G03B 13/20* (2013.01); *G03B 15/05* (2013.01); *H04N 5/2354* (2013.01); *H04N 5/23212* (2013.01)

(58) Field of Classification Search
USPC .................................. 396/62, 121
See application file for complete search history.

(56) References Cited

U.S. PATENT DOCUMENTS

| 5,517,276 | A * | 5/1996 | Higaki et al. ............... 396/56 |
| 6,327,434 | B1 * | 12/2001 | Okumura et al. ............. 396/62 |
| 6,381,413 | B1 * | 4/2002 | Harada ....................... 396/80 |
| 6,624,851 | B1 * | 9/2003 | Okajima et al. ............. 348/347 |
| 2003/0235410 | A1 * | 12/2003 | Kurosawa ................... 396/109 |
| 2011/0164868 | A1 * | 7/2011 | Hamada ..................... 396/123 |

FOREIGN PATENT DOCUMENTS

JP 2006-126611 A 5/2006

* cited by examiner

*Primary Examiner* — Clayton E Laballe
*Assistant Examiner* — Noam Reisner
(74) *Attorney, Agent, or Firm* — Sony Corporation

(57) ABSTRACT

Provided is an imaging apparatus including a ranging area selection unit configured to select an area for measuring a distance to an object to be photographed from a plurality of candidate areas preset in an area according to an angle of view of a photographing lens, the area being selected as a ranging area, an irradiation unit configured to irradiate auxiliary light onto the object to be photographed, a distance to the object to be photographed being measured in the ranging area, and a ranging unit configured to measure the distance to the object to be photographed, to which the auxiliary light has been irradiated, in the ranging area.

12 Claims, 15 Drawing Sheets (a)

(b)

(a)

(b)

(a) (b)

(a)

(b)

(a)

(b)

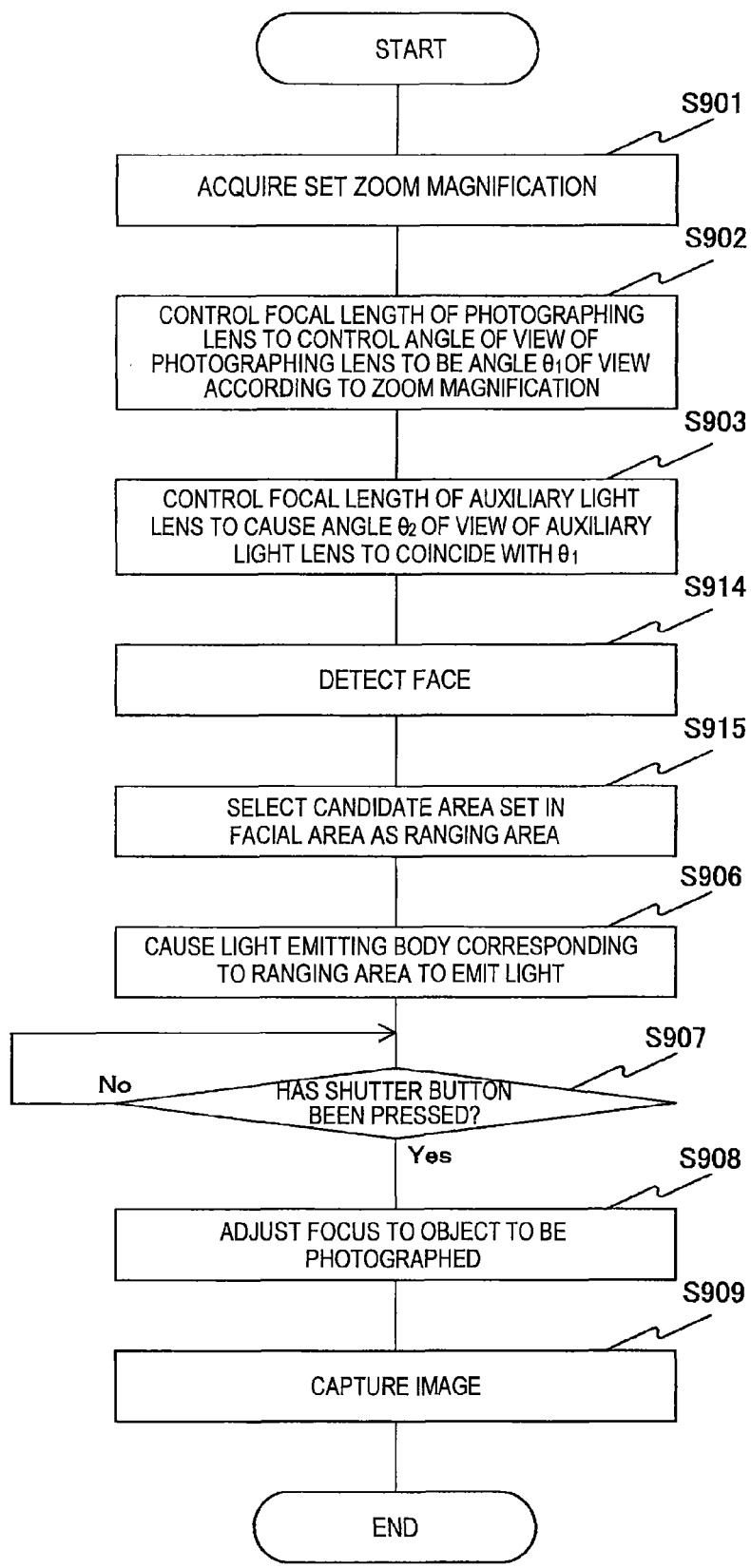

IMAGING APPARATUS AND CONTROL METHOD OF IMAGING APPARATUS

BACKGROUND

The present disclosure relates to an imaging apparatus and a control method of the imaging apparatus, and more particularly, an imaging apparatus which measures a distance to an object to be photographed, and a control method of the imaging apparatus.

An imaging apparatus has a function of automatically adjusting a focus, a so-called AF (Auto Focus) function, in many cases. Schemes of measuring a distance in the AF function are classified into an active scheme and a passive scheme. According to the active scheme, infrared rays or supersonic waves are irradiated onto an object to be photographed, and the distance is measured based on a time and an irradiation angle until a reflected wave is returned after the irradiation. Meanwhile, according to the passive scheme, photometry of the brightness of an object to be photographed is performed to detect a phase difference or contrast, so that the distance is measured. In the case of using the passive scheme, since it is difficult to detect a phase difference or contrast in a dark place, an imaging apparatus has a light source for irradiating light called auxiliary light onto an object to be photographed in many cases.

Here, in an imaging apparatus driven by a battery, in order to ensure a long operation time, there has been an increased demand for reducing the amount of power consumption of the imaging apparatus. In this regard, an imaging apparatus which changes the number of light emitting bodies to be turned on according to a photographing angle of view or a photographing distance when a light source of auxiliary light is provided with the plurality of light emitting elements, thereby suppressing the amount of power consumption, has been proposed (for example, see JP 2006-126611A). In detail, the imaging apparatus is controlled such that the number of light emitting bodies to be turned on is reduced as the photographing angle of view becomes small. Furthermore, the imaging apparatus is controlled such that the number of light emitting bodies to be turned on is reduced as the photographing distance is short.

SUMMARY

However, in the aforementioned related art, ranging may be inefficiently performed. That is, in the passive scheme, only a part of an object to be photographed on a screen may be ranged. However, even in this case, the aforementioned imaging apparatus does not change the number of light emitting bodies to be turned on unless there is a change in the photographing angle of view or the photographing distance. As a consequence, since auxiliary light is irradiated onto an object to be photographed which has not been ranged, power is unnecessarily wasted, resulting in a reduction of efficiency of ranging.

In light of the foregoing, it is desirable to improve efficiency of ranging in an imaging apparatus.

The present technology has been made to solve the aforementioned issues. According to a first embodiment of the present technology, there is provided an imaging apparatus and a control method of the imaging apparatus, including a ranging area selection unit configured to select an area for measuring a distance to an object to be photographed from a plurality of candidate areas preset in an area according to an angle of view of a photographing lens, the area being selected as a ranging area, an irradiation unit configured to irradiate auxiliary light onto the object to be photographed, a distance to the object to be photographed being measured in the ranging area, and a ranging unit configured to measure the distance to the object to be photographed, to which the auxiliary light has been irradiated, in the ranging area. In this way, it is possible to obtain an effect that auxiliary light is irradiated onto an object to be photographed, a distance of which is measured in a selected ranging area.

Further, in the first embodiment, the imaging apparatus may further include an auxiliary light lens viewing angle control unit configured to control an angle of view of an auxiliary light lens for irradiating the auxiliary light, and to cause the angle of view of the auxiliary light lens to coincide with an angle of view of the photographing lens. In this way, it is possible to obtain an effect that the angle of view of an auxiliary light lens coincides with the angle of view of a photographing lens.

Further, in the first embodiment, the auxiliary light lens viewing angle control unit may adjust a focal length of the auxiliary light lens such that a ratio of a size of an area in which the auxiliary light is generated to a size of an area of a photographing pixel is equal to a ratio of the focal length of the auxiliary light lens to a focal length of the photographing lens, thereby causing the angle of view of the auxiliary light lens to coincide with the angle of view of the photographing lens. In this way, it is possible to obtain an effect that the focal length of an auxiliary light lens is adjusted such that the ratio of a size of an area in which auxiliary light is generated to a size of an area of a photographing pixel is equal to the ratio of the focal length of the auxiliary light lens to the focal length of a photographing lens.

Further, in the first embodiment, the irradiation unit may include a light emitting section configured to generate the auxiliary light through light emission of a plurality of light emitting bodies associated with the plurality of candidate areas, and a light emission control section configured to cause a light emitting body corresponding to the selected candidate area among the plurality of light emitting bodies to emit light. In this way, it is possible to obtain an effect that a light emitting body corresponding to a selected candidate area among a plurality of light emitting bodies emits light.

Further, in the first embodiment, the irradiation unit may refract the auxiliary light from the light emitting section in a barrel of the auxiliary light lens, and irradiate the refracted light onto the object to be photographed. In this way, it is possible to obtain an effect that auxiliary light in a barrel of an auxiliary light lens is refracted and irradiated.

Further, in the first embodiment, the imaging apparatus may further include a focusing control unit configured to adjust a focus to the measured distance. In this way, it is possible to obtain an effect that a focus is adjusted to an object to be photographed.

Further, in the first embodiment, the imaging apparatus may further include an object detection unit configured to detect a predetermined object in an area according to the angle of view of the photographing lens. The ranging area selection unit may select, as the ranging area, a candidate area set in an area in which the object has been detected from the plurality of candidate areas. In this way, it is possible to obtain an effect that a candidate area set in an area in which an object has been detected is selected as a ranging area.

According to the present disclosure, it is possible to obtain superior effects by which efficiency of ranging is improved in an imaging apparatus.

BRIEF DESCRIPTION OF THE DRAWINGS

FIG. 15 is a flowchart illustrating an example of an operation of an imaging apparatus in a second embodiment.

DETAILED DESCRIPTION OF THE EMBODIMENT(S)

Figure 1:
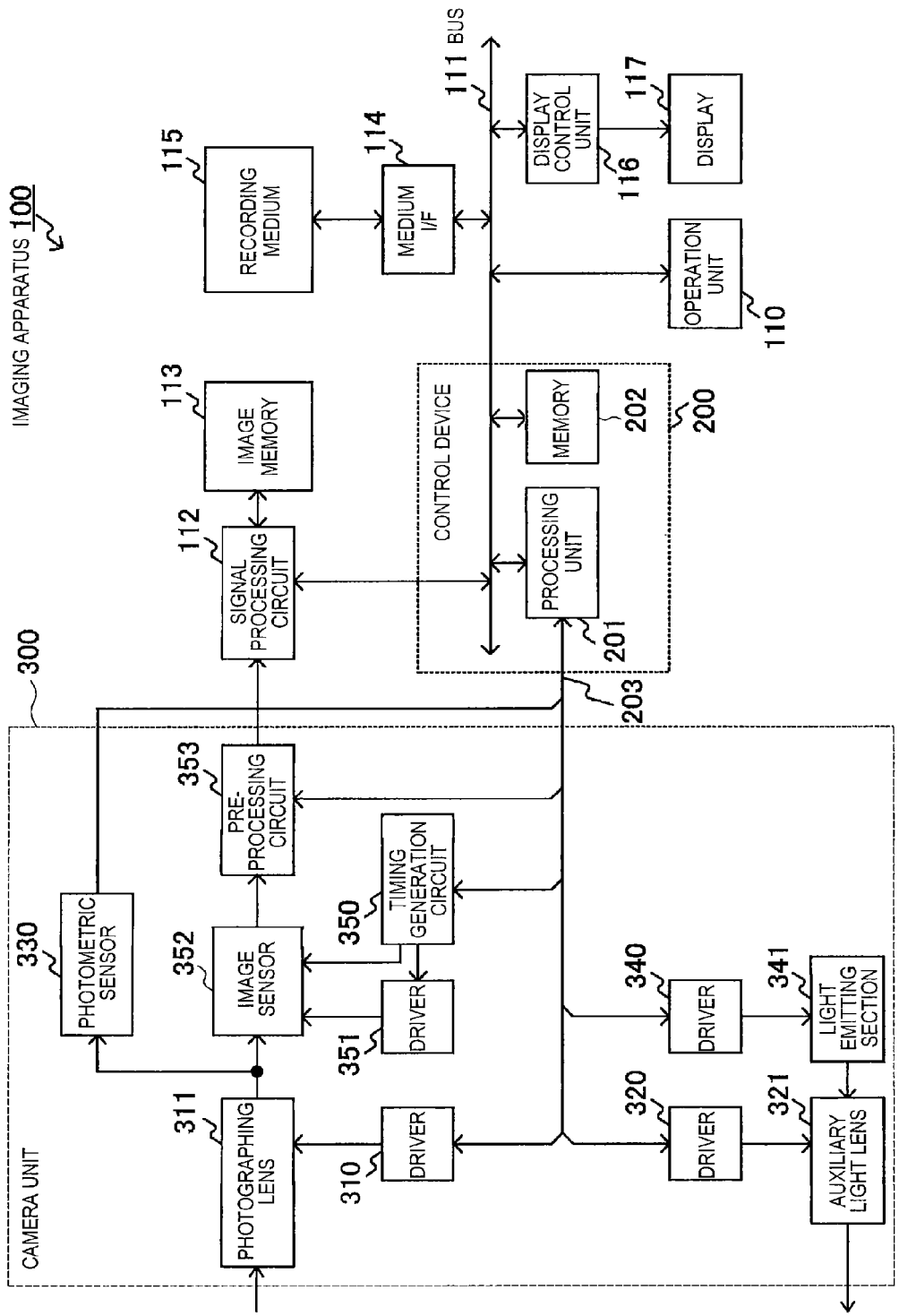
FIG. 1 is a block diagram illustrating a configuration example of an imaging apparatus in a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an example (hereinafter referred to as an embodiment) for implementing the present disclosure will be described. In addition, the description will be given in the following order.

1. First Embodiment (example in which auxiliary light is irradiated onto only selected ranging area)

2. Second Embodiment (example in which ranging area set in facial area is selected)

1. First Embodiment

Configuration Example of Imaging Apparatus

FIG. 1 is a block diagram illustrating a configuration example of an imaging apparatus 100 in a first embodiment. The imaging apparatus 100 includes an operation unit 110, a bus 111, a signal processing circuit 112, an image memory 113, a medium interface 114, a recording medium 115, a display control unit 116, a display 117, a control device 200, and a camera unit 300.

The control device 200 controls the entire imaging apparatus 100, and includes a processing unit 201 and a memory 202. The camera unit 300 captures an object to be photographed and generates image data. The camera unit 300 includes drivers 310, 320, 340, and 351, a photographing lens 311, an auxiliary light lens 321, a photometric sensor 330, a light emitting section 341, a timing generation circuit 350, an image sensor 352, and a pre-processing circuit 353.

The operation unit 110 generates an operation signal according to a user's operation with respect to a touch panel, a button and the like, and outputs the operation signal to the control device 200 through the bus 111. The operation signal includes a signal for operating a shutter button, or a signal for selecting a zoom magnification and a ranging area. Here, the ranging area is an area according to the angle of view of the photographing lens 311, and is an area used in order to measure a distance to an object to be photographed through photometry. In more detail, the area according to the angle of view of the photographing lens 311 is a photographing area determined according to the angle of view of the photographing lens 311, and for example, is an area on a screen projected on a finder. The ranging area is selected from a plurality of candidate areas, which have been preset in the screen, through a user's operation and the like.

The bus 111 is a common path through which the operation unit 110, the signal processing circuit 112, the medium interface 114, the display control unit 116, and the control device 200 exchange data with one another.

The processing unit 201 controls the angle of view of the photographing lens 311 through a signal line 203 and the driver 320 according to a set zoom magnification. Furthermore, the processing unit 201 controls the angle of view of the auxiliary light lens 321 through the signal line 203 and the driver 310, thereby causing the angle of view of the auxiliary light lens 321 to coincide with the angle of view of the photographing lens 311. Then, the processing unit 201 selects the ranging area from the candidate areas through a user's operation.

Moreover, the processing unit 201 controls the light emitting section 341 through the driver 340 according to a predetermined operation (for example, half pressing) of the shutter button, and causes auxiliary light to be irradiated onto only an object to be photographed, a distance of which is measured in the ranging area. Then, the processing unit 201 receives a photometric value obtained through photometry from the photometric sensor 330, calculates a focusing position of the photographing lens 311 from the photometric value, and moves the photographing lens 311 to the focusing position. Furthermore, the processing unit 201 controls the image sensor 352 through the timing generation circuit 350 and the driver 351 according to a predetermined operation (for example, full pressing) of the shutter button, and causes an image to be captured.

Then, if image data is received from the signal processing circuit 112, the processing unit 201 accesses the recording medium 115 through the bus 111 and the medium interface 114, and holds the image data in the recording medium 115. Furthermore, the processing unit 201 reads the image data stored in the recording medium 115, and controls the display 117 through the bus 111 and the display control unit 116, thereby causing the image data to be displayed on the display 117.

The memory 202 is used as a working area for temporarily storing a program executed in the processing unit 201, or data necessary for a process. An area for storing the program may be configured by a flash ROM (Read Only memory), and an area for primarily storing the data necessary for a process may be configured by a RAM (Random Access Memory).

The driver 310 changes the position of the photographing lens 311 under the control of the control device 200. The photographing lens 311 forms an image of an object to be photographed on the image sensor 352. The photographing lens 311 includes a plurality of lenses, and changes the positions of these lenses, thereby changing the focal length in a constant range. The photographing lens 311, for example, is a so-called four-group zoom lens including a focus lens, a variator, a compensator, and a master lens. In addition, the imaging apparatus 100 may use a lens such as a two-group zoom lens or a three-group zoom lens, which has a configuration different from that of the four-group zoom lens, as the photographing lens 311 if it can change the focal length.

The driver 320 changes the position of the auxiliary light lens 321 under the control of the control device 200. The auxiliary light lens 321 irradiates auxiliary light from the light emitting section 341 onto an object to be photographed. Furthermore, similarly to the photographing lens 311, the auxiliary light lens 321 is a lens (for example, a four-group zoom lens) capable of changing the focal length in a constant range.

The photometric sensor 330 measures the brightness of an object to be photographed in the candidate area. The photometric sensor 330, for example, performs photometry using a TTL (Through-the-Lens) photometric scheme of performing photometry of incident light having passed through the photographing lens 311. The photometric sensor 330 outputs a sensor signal indicating a photometric result to the control device 200. In addition, the imaging apparatus 100 may perform photometry using an external light system for performing photometry of light received through a light receiving window provided on the front surface of the imaging apparatus 100.

The driver 340 causes the light emitting section 341 to emit light under the control of the control device 200. The light emitting section 341 emits the auxiliary light.

The timing generation circuit 350 generates timing for driving the driver 351 and the image sensor 352 based on the operation content and shutter speed of the shutter button. The driver 351 drives the image sensor 352 according to the generated timing, thereby causing an image of an object to be photographed to be formed. The image sensor 352 converts light from the photographing lens 311 into an electrical signal through photoelectric conversion, and outputs the electrical signal to the pre-processing circuit 353. The image sensor 352 may be configured of a CCD (Charge Coupled Device) sensor, a CMOS (Complementary Metal Oxide Semiconductor) sensor, and the like.

The pre-processing circuit 353 performs a CDS (Correlated Double Sampling) process or an AGC (Automatic Gain Control) process with respect to image information of the electrical signal supplied from the image sensor 352. The CDS process is for maintaining a high signal-to-noise ratio (S/N ratio), and the AGC process is for controlling gain. The pre-processing circuit 353 performs A/D (Analog-to-Digital) conversion on a signal obtained through the CDS process or the AGC process, forms image data based on a digital signal, and outputs the image data to the signal processing circuit 112.

The signal processing circuit 112 performs a camera signal process such as AE (Auto Exposure) or AWB (Auto White Balance) on the image data from the pre-processing circuit 353. Furthermore, the signal processing circuit 112 performs data compression on image data variously adjusted through the camera signal process according to necessity, and outputs compressed data to the control device 200. As a data area necessary at the time of the compression process, the image memory 113 is used.

The medium interface 114 enables writing of the image data to the recording medium 115 and reading of the image data from the recording medium 115. As the recording medium 115, it is possible to use various media including a so-called memory card using a semiconductor memory, an optical recording medium such as a recordable DVD (Digital Versatile Disc) or a recordable CD (Compact Disc), a magnetic disk, and the like.

The display control unit 116 forms an image signal for the display 117 from the supplied image data, and supplies the image signal to the display 117. In this way, an image corresponding to the image data recorded on the recording medium 115 is displayed on a display screen of the display 117.

[Functional Configuration Example of Control Device]

Figure 2:
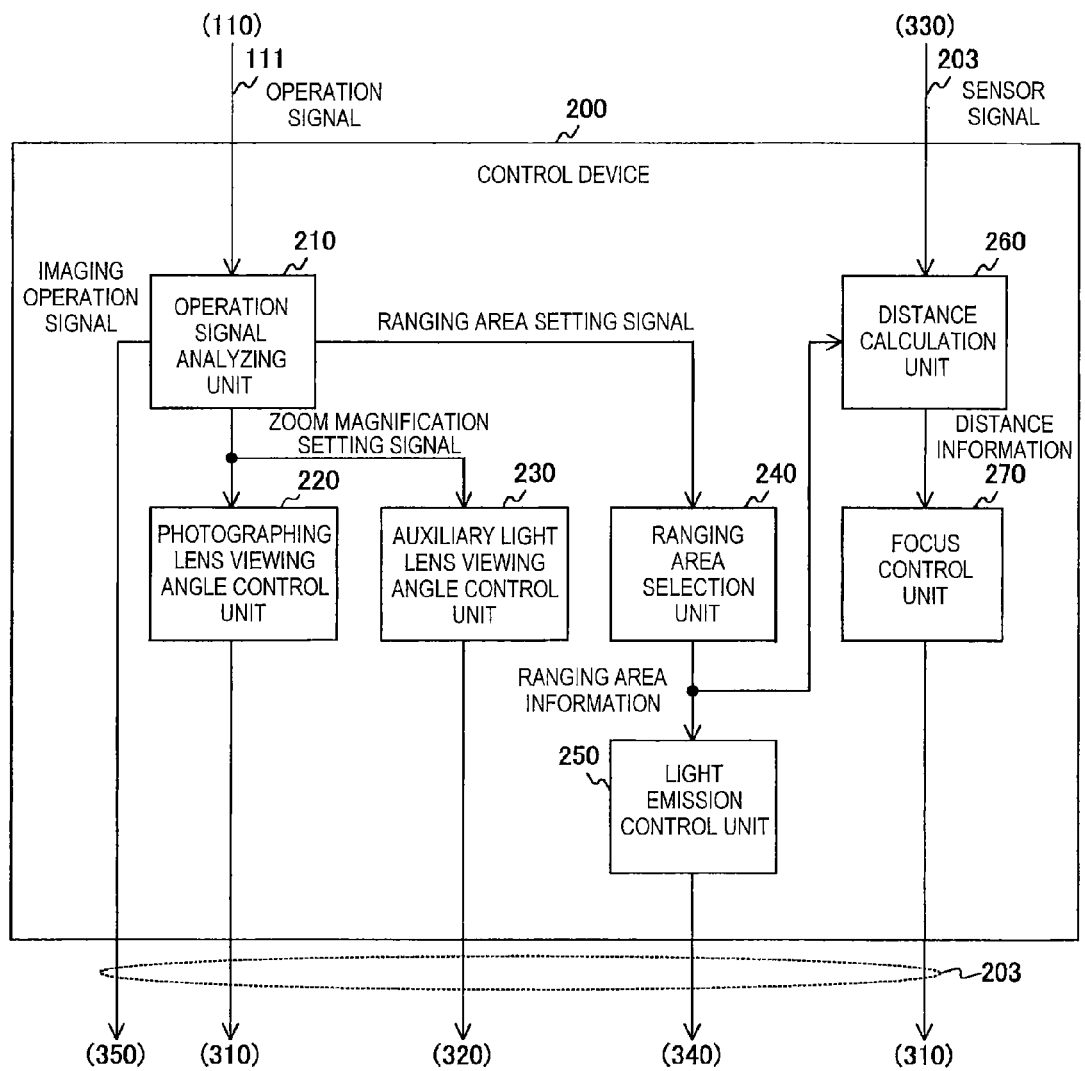
FIG. 2 is a diagram illustrating a functional configuration example of a control device in a first embodiment.

FIG. 2 is a diagram illustrating a functional configuration example of the control device 200 in the first embodiment. The control device 200 includes an operation signal analyzing unit 210, a photographing lens viewing angle control unit 220, an auxiliary light lens viewing angle control unit 230, a ranging area selection unit 240, a light emission control unit 250, a distance calculation unit 260, and a focus control unit 270.

The operation signal analyzing unit 210 analyzes the operation signal from the operation unit 110. Based on an analysis result of the operation signal, the operation signal analyzing unit 210 generates a zoom magnification setting signal, a ranging area setting signal, or an imaging operation signal. The zoom magnification setting signal indicates a set zoom magnification. The ranging area setting signal indicates a selected ranging area. The imaging operation signal indicates the operation content of the shutter button. The operation signal analyzing unit 210 outputs the zoom magnification setting signal to the photographing lens viewing angle control unit 220 and the auxiliary light lens viewing angle control unit 230. Furthermore, the operation signal analyzing unit 210 outputs the ranging area setting signal to the ranging area selection unit 240, and outputs the imaging operation signal to the timing generation circuit 350.

The photographing lens viewing angle control unit 220 controls the angle of view of the photographing lens 311 according to a zoom magnification. In detail, the photographing lens viewing angle control unit 220 causes a focal length $f_1$ of the photographing lens 311 to coincide with a value obtained by multiplying the shortest focal length in a range changeable by the photographing lens 311 by the zoom magnification, thereby controlling the angle of view. For example, when the shortest focal length (a focal length at a wide angle end) is set to 5 millimeters (mm) and the zoom magnification is two times, the photographing lens viewing angle control unit 220 sets the focal length $f_1$ of the photographing lens 311 to 10 millimeters (mm). Furthermore, the photographing lens viewing angle control unit 220 controls the position of the focus lens of the photographing lens 311 along a zoom tracking curve such that a focused state is maintained according to the control of the focal length of the photographing lens 311. Here, the zoom tracking curve indicates a relation between the focal length of the photographing lens 311 and the position of the focus lens in the focused state.

The auxiliary light lens viewing angle control unit 230 controls an angle of view $\theta_2$ of the auxiliary light lens 321 to cause the angle of view $\theta_2$ of the auxiliary light lens 321 to coincide with the angle of view $\theta_1$ of the photographing lens 311. A unit of $\theta_1$ and $\theta_2$, for example, is "° (degrees)." In detail, based on a relational expression which will be described later, the auxiliary light lens viewing angle control unit 230 calculates a focal length $f_2$ of the auxiliary light lens 321 by which the same angle of view as the angle of view $\theta_1$ of the photographing lens 311 is obtained. Then, the auxiliary light lens viewing angle control unit 230 controls the angle of view of the auxiliary light lens 321 to coincide with the calculated $f_2$.

The ranging area selection unit 240 selects the ranging area from the candidate areas according to the ranging area setting signal. The ranging area selection unit 240 outputs ranging area information for specifying the selected ranging area to the light emission control unit 250 and the distance calculation unit 260.

The light emission control unit 250 controls the light emitting section 341 to irradiate auxiliary light onto only an object to be photographed which is ranged in the ranging area. The light emitting section 341, for example, includes a plurality of light emitting bodies. Auxiliary light from these light emitting bodies is irradiated onto a plurality of irradiation regions. The light emission control unit 250 associates the light emitting bodies with candidate areas in the irradiation region in advance. Then, if a candidate area is selected, the light emission control unit 250 causes only a light emitting body corresponding to the selected candidate area to emit light. The candidate area body, for example, includes a light emitting diode (LED). An association example of the candidate area and the light emitting body will be described later. In addition, optical units of the light emitting section 341, the light emission control unit 250, and the auxiliary light lens 321 are an example of an irradiation unit indicated in the claims.

The distance calculation unit 260 extracts a photometric value in the ranging area from photometric values, and performs a predetermined operation on the extracted photometric value, thereby calculating a distance to an object to be photographed. The distance calculation unit 260, for example, calculates the distance using a phase difference detection method. In the phase difference detection method, the distance to the object to be photographed is calculated from shift (that is, a phase difference) of light quantity distribution of two images separated by a separator lens. Furthermore, in the phase difference detection method, a line sensor, in which light receiving elements are arranged in a row, and the like are used as the photometric sensor 330. The distance calculation unit 260 outputs distance information indicating the calculated distance to the focus control unit 270. In addition, the distance calculation unit 260 may calculate the distance using methods other than the phase difference detection method. For example, the distance calculation unit 260 may calculate the distance to the object to be photographed using a contrast detection method of calculating a distance with the highest contrast. Furthermore, the photometric sensor 330 performs photometry in the candidate area, and the distance calculation unit 260 extracts a photometric value in the ranging area from photometric values. However, it may be possible to employ a configuration in which the photometric sensor 330 may perform photometry only in the ranging area. With such a configuration, it is sufficient if the ranging area selection unit 240 outputs ranging area information to the photometric sensor 330 instead of the distance calculation unit 260. Furthermore, the photometric sensor 330 and the distance calculation unit 260 are an example of a ranging unit indicated in the claims.

The focus control unit 270 adjusts a focus to the distance indicated by the distance information. In detail, the focus control unit 270 controls the position of the focus lens of the photographing lens 311, and adjusts a distance (an image distance) to an image of an object from the photographing lens 311, thereby performing focusing.

Figure 3:
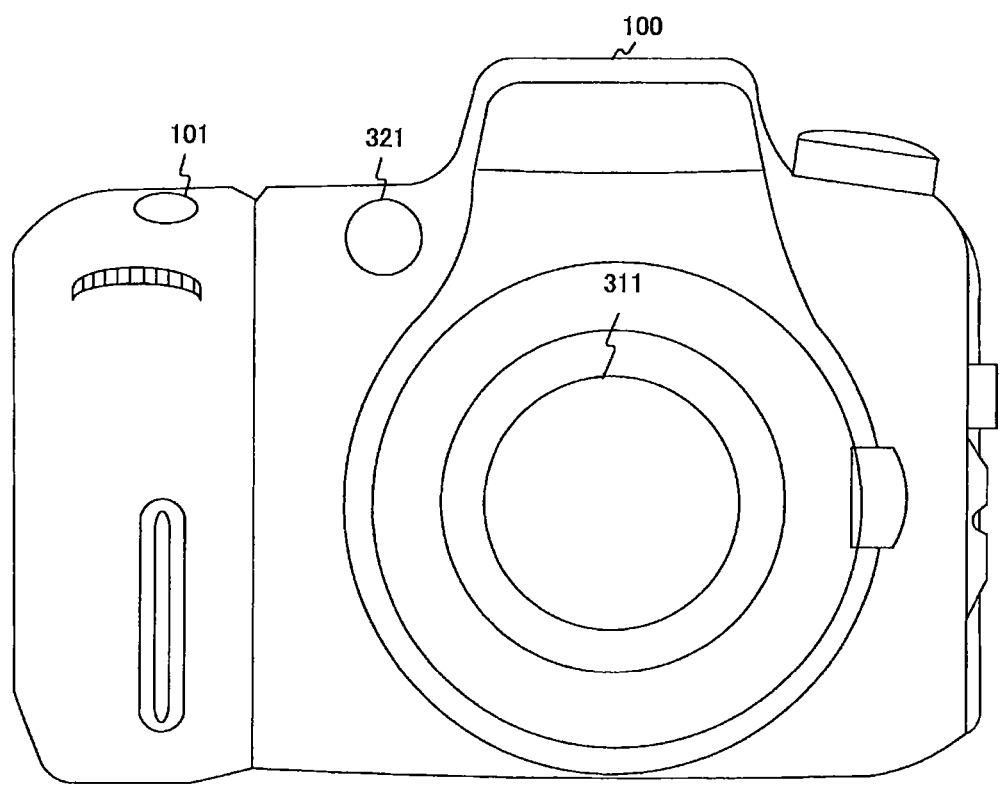
FIG. 3 is an example of a front view of an imaging apparatus in a first embodiment.

FIG. 3 is an example of a front view of the imaging apparatus 100 in the first embodiment. A shutter button 101, the photographing lens 311, and the auxiliary light lens 321 are provided on the front surface of the imaging apparatus 100. The shutter button 101 is a button for performing an imaging operation and a focusing operation. If the shutter button 101 is half pressed, the imaging apparatus 100 irradiates a desired quantity of auxiliary light from the auxiliary light lens 321, thereby starting focus adjustment. If the shutter button 101 is fully pressed in a focused state, the imaging apparatus 100 starts to capture image data. Furthermore, the photographing lens 311 is mounted on a lens mount, and the auxiliary light lens 321 is arranged adjacent to the photographing lens 311.

Figure 4:
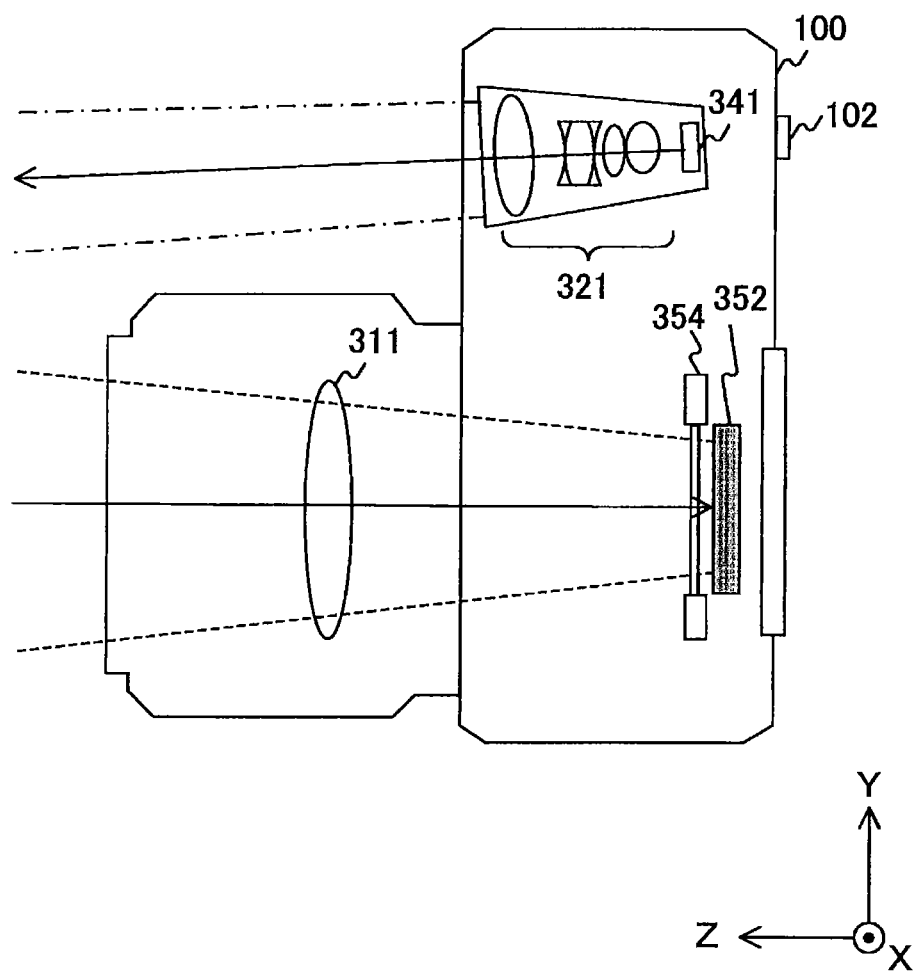
FIG. 4 is a diagram illustrating an internal mechanism example of an imaging apparatus in a first embodiment when viewed from the top.

FIG. 4 is a diagram illustrating an internal mechanism example of the imaging apparatus 100 in the first embodiment when viewed from the top. Parts including the photographing lens 311, a focal plane shutter 354, the image sensor 352, the auxiliary light lens 321, and the light emitting section 341 are provided in the imaging apparatus 100. Furthermore, a zoom button 102 is provided on the back of the imaging apparatus 100. The zoom button 102 is a button for changing a zoom magnification. Furthermore, the photographing lens 311 is mounted on the lens mount of the imaging apparatus 100, and the image sensor 352 is provided on a surface on which an image of incident light from the photographing lens 311 is formed. The focal plane shutter 354 is provided between the photographing lens 311 and the image sensor 352. The auxiliary light lens 321 is provided on the front surface of the imaging apparatus 100. The light emitting section 341 is provided on a surface parallel to the principal plane of the auxiliary light lens 321. Here, because it is necessary for the auxiliary light lens 321 to irradiate auxiliary light onto an object to be photographed, the auxiliary light lens 321 is disposed with a small angle provided to an optical axis of auxiliary light with respect to an optical axis of incident light.

Figure 5:
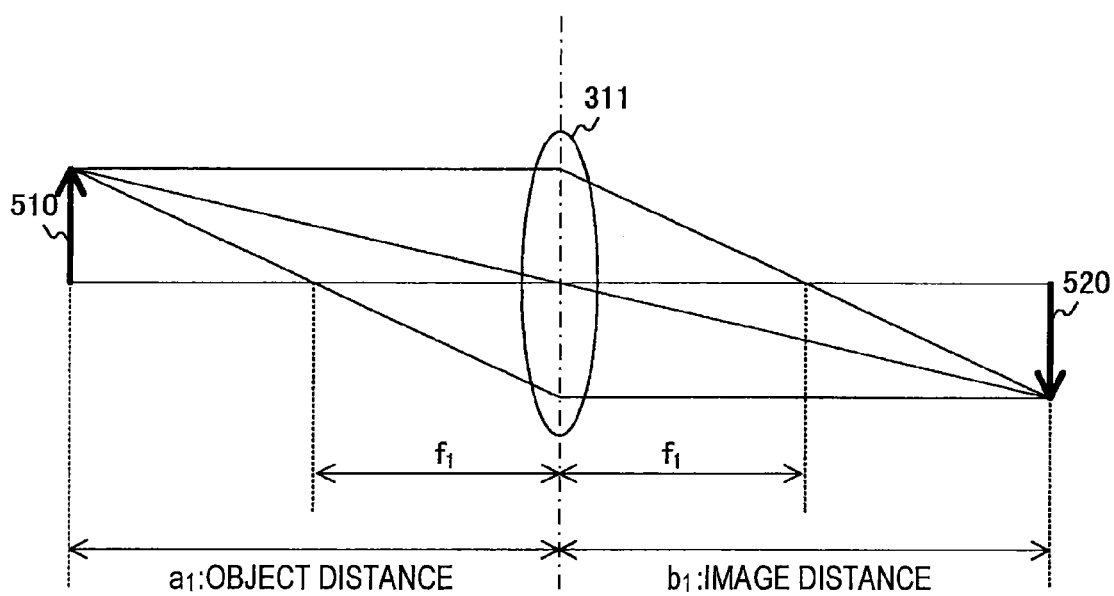
FIG. 5 is a diagram for describing a photographing magnification in a first embodiment.

Next, with reference to FIG. 5, the definition of a photographing magnification will be described. FIG. 5 is a diagram for describing a photographing magnification. When an image 520 of an object 510 is formed by the photographing lens 311, a relation represented by Equation 1 below is satisfied based on a lens equation under ideal conditions. In Equation 1 below, $a_1$ denotes a distance (an object distance) from the object 510 to the photographing lens 311. $b_1$ denotes a distance (an image distance) from the photographing lens 311 to the image 520. A unit of the $a_1$, $b_1$, and $f_1$, for example, is millimeters (mm).

$$1/a_1 + 1/b_1 = 1/f_1 \qquad \text{Equation 1}$$

Meanwhile, also in the auxiliary light lens 321, Equation 2 below is satisfied based on a lens equation. In Equation 2 below, $a_2$ denotes a distance (an object distance) from the object 510 to the auxiliary light lens 321. $b_2$ denotes a distance (an image distance) from the auxiliary light lens 321 to the image 520.

$$1/a_2 + 1/b_2 = 1/f_2 \quad \text{Equation 2}$$

Here, a photographing magnification $m_1$ of the photographing lens 311 is defined by Equation 3 below.

$$m_1 = b_1/a_1 \quad \text{Equation 3}$$

Furthermore, a photographing magnification $m_2$ of the auxiliary light lens 321 is defined by Equation 4 below.

$$m_2 = b_2/a_2 \quad \text{Equation 4}$$

Figure 6:
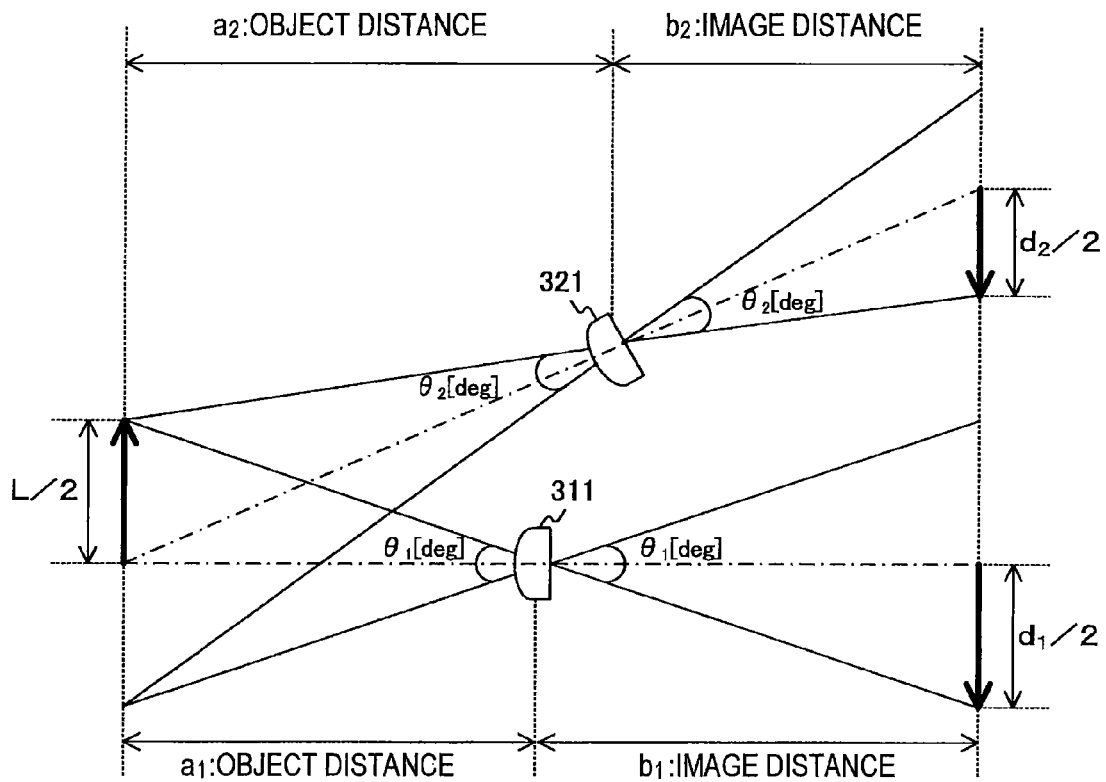
FIG. 6 is a diagram for describing a relation between an angle of view of a photographing lens and an angle of view of an auxiliary light lens in a first embodiment.

Next, with reference to FIG. 6, a description will be provided for a method of calculating the focal length $f_2$ of the auxiliary light lens 321 such that the angle of view of the photographing lens 311 coincides with the angle of view of the auxiliary light lens 321. FIG. 6 is a diagram for describing a relation between the angle of view $\theta_1$ of the photographing lens 311 and the angle of view $\theta_2$ of the auxiliary light lens 321 in the first embodiment. Here, a diagonal dimension of an area (hereinafter referred to as an "image area") used in the photographing of an image in the image sensor 352 is set as $d_1$. Furthermore, a diagonal dimension of an area (hereinafter referred to as a "light emitting area") where light is emitted in the light emitting section 341 is set as $d_2$. An actual diagonal dimension of an object having an image formed on the image area is set as L. A unit of $d_1$, $d_2$, and L, for example, is millimeters (mm).

In FIG. 6, since a triangle with a height $a_1$ from a bottom L to a principal point (an apex) of the photographing lens 311 is similar to a triangle with a height $b_1$ from a bottom $d_1$ to the principal point (the apex) of the photographing lens 311, Equation 5 below is satisfied.

$$L : a_1 = d_1 : b_1 \quad \text{Equation 5}$$

When the angle of view $\theta_1$ of the photographing lens 311 is equal to the angle of view $\theta_2$ of the auxiliary light lens 321, a triangle with a height $b_2$ from a bottom $d_2$ to a principal point (an apex) of the auxiliary light lens 321 is different from a triangle with a height $a_2$ from a bottom L to the principal point (the apex) of the auxiliary light lens 321. Therefore, Equation 6 below is satisfied.

$$L : a_2 = d_2 : b_2 \quad \text{Equation 6}$$

L is removed from Equation 5 and Equation 6 to obtain Equation 7 below.

$$a_1 \times (d_1/b_1) = a_2 \times (d_2/b_2) \quad \text{Equation 7}$$

$a_1$, $b_1$, $a_2$, and $b_2$ are removed from Equation 3, Equation 4, and Equation 7 to obtain Equation 8 below.

$$m_2 = m_1 \times (d_2/d_1) \quad \text{Equation 8}$$

$a_1$, $a_2$, $m_1$ and $m_2$ are removed from Equation 1 to Equation 4, and Equation 8 to obtain Equation 9 below.

$$(b_2 - f_2)/f_2 = d_2(b_1 - f_1)/(d_1 f_1) \quad \text{Equation 9}$$

Here, when the angle of view of the photographing lens 311 coincides with the angle of view of the auxiliary light lens 321 through FIG. 6, since the triangle having the bottom $d_1$ and the apex (the principal point of the photographing lens 311) is different from the triangle having the bottom $d_2$ and the apex (the principal point of the auxiliary light lens 321), Equation 10 below is satisfied.

$$b_1 : d_1 = b_2 : d_2 \quad \text{Equation 10}$$

Equation 10 is modified to obtain Equation 11 below.

$$b_2 = b_1 \times d_2/d_1 \quad \text{Equation 11}$$

If $b_2$ is removed from Equation 9 and Equation 11, Equation 12 below is obtained.

$$f_2 = d_2 b_1 f_1 / \{d_2(b_1 - f_1) + d_1 f_1\} \quad \text{Equation 12}$$

Since the position of the focus lens of the photographing lens 311 is obtained from the focal length $f_1$ of the photographing lens 311 based on the zoom tracking curve, $b_1$ is obtained from the position of the focus lens. Furthermore, since $d_1$ and $d_2$ have fixed values, the focal length $f_2$ of the auxiliary light lens 321 when the angle of view of the auxiliary light lens 321 coincides with the angle of view of the photographing lens 311 having the focal length $f_1$ is calculated from Equation 12 above.

Figure 7:
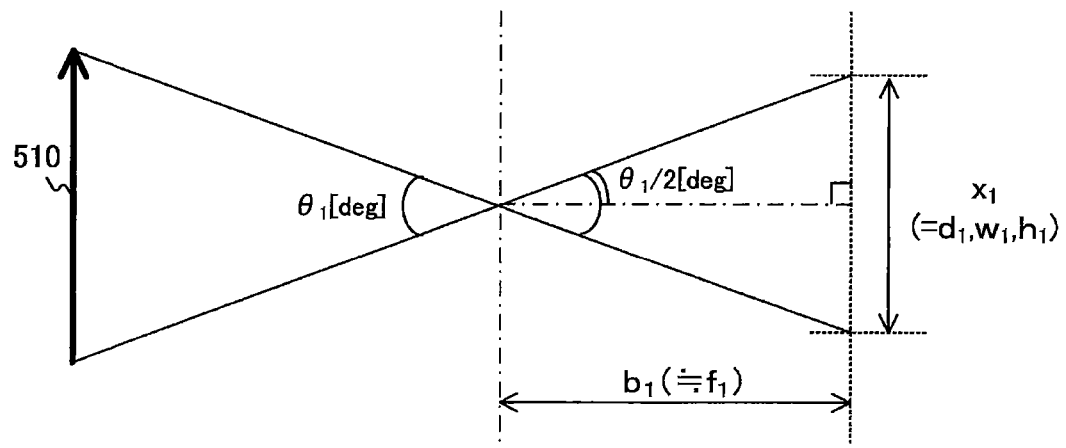
FIG. 7(a) is a diagram for describing a relation between an angle of view and dimensions of a focal length and an image area in a first embodiment.
FIG. 7(b) is a diagram illustrating an example of a dimension of an image area in which an image is formed in a first embodiment.
Figure 7:
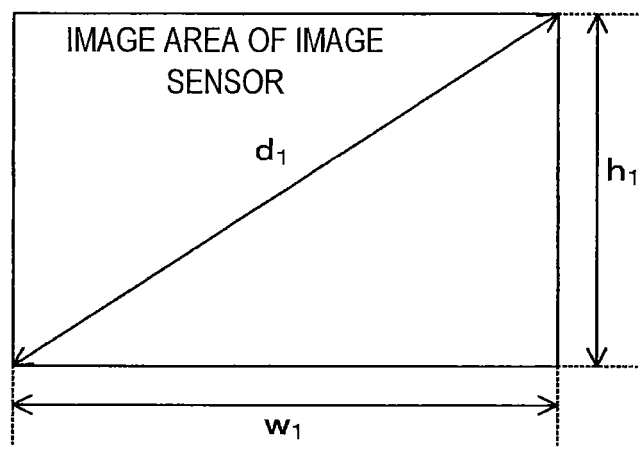

In the aforementioned example, a method of calculating the focal length $f_2$ through Equation 12 above has been described. However, in the following example, a method of simply calculating the focal length $f_2$ will be described. FIG. 7 is a diagram for describing a relation between dimensions of a focal length and an image area and an angle of view in the first embodiment. FIG. 7(a) is a diagram illustrating a relation between dimensions of a focal length and an image and an angle of view. A dimension of an image of the object 510 formed on a surface of an image distance $b_1$ by the photographing lens 311 in the range of the angle of view $\theta_1$ is set as x. Here, when the photographing magnification $m_1$ is relatively small, since $b_1$ approximates the focal length $f_1$, a tangent of angle $\theta_1/2$ is defined through Equation 13 below based on a trigonometric function.

$$\tan\left(\frac{\theta_1}{2}\right) = \frac{x}{2f_1} \quad \text{Equation 13}$$

Equation 13 is modified to obtain Equation 14 below.

$$\theta_1 = 2\tan^{-1}\left(\frac{x_1}{2f_1}\right)[\text{rad}] = \frac{180}{\pi} \times 2\tan^{-1}\left(\frac{x_1}{2f_1}\right)[deg] \quad \text{Equation 14}$$

FIG. 7(b) is a diagram illustrating an example of a dimension of an image area in which an image is formed. If a diagonal dimension, a horizontal dimension, and a vertical dimension of the image area are set as $d_1$, $w_1$, and $h_1$, these dimensions and $f_1$ are put into x of Equation 14 above, so that a diagonal angle of view, a horizontal angle of view, and a vertical angle of view are obtained.

Similarly, the angle of view of the auxiliary light lens 321 is calculated from Equation 15 below. In Equation 15 below, $\theta_2$ is the angle of view of the auxiliary light lens, $x_2$ is a dimension of a light emitting area of the light emitting section 341, and $f_2$ is the focal length of the auxiliary light lens 321.

$$\theta_2 = 2\tan^{-1}\left(\frac{x_2}{2f_2}\right)[\text{rad}] = \frac{180}{\pi} \times 2\tan^{-1}\left(\frac{x_2}{2f_2}\right)[deg] \quad \text{Equation 15}$$

In Equation 14 and Equation 15 above, the dimensions of the image area and the light emitting area have fixed values for each model of the imaging apparatus 100. Therefore, the imaging apparatus 100 controls the focal lengths $f_1$ and $f_2$, thereby controlling the angles of view $\theta_1$ and $\theta_2$. In order to cause the angles of view $\theta_1$ and $\theta_2$ to coincide with each other, it is sufficient if $f_2$ is controlled such that a ratio of $x_2$ to $x_1$ coincides with a ratio of $f_2$ to $f_1$ based on Equation 14 and Equation 15 above. In detail, $f_2$ is calculated from Equation 16 below obtained from Equation 14 and Equation 15 above.

$$f_2 = f_1(x_2/x_1) \quad \text{Equation 16}$$

Since the ratio of $x_2$ to $x_1$ is constant, when the photographing magnification $m_1$ is relatively small, it is possible to easily calculate an approximate focal length $f_2$ at the photographing magnification $m_1$ through Equation 16. When the photographing magnification $m_1$ is relatively large or accuracy is necessary, the focal length $f_2$ is calculated from Equation 12 above.

Figure 8:
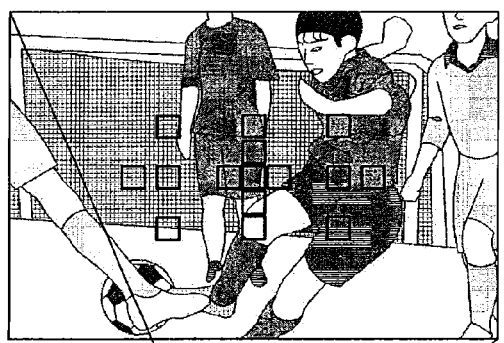
FIG. 8(a) is a diagram illustrating an example of an angle of view of a photographing lens in which the angle of view of the photographing lens coincides with an angle of view of an auxiliary light lens in a first embodiment.
FIG. 8(b) is a diagram illustrating an example of an angle of view of an auxiliary light lens in which an angle of view of a photographing lens coincides with the angle of view of the auxiliary light lens in a first embodiment.
Figure 8:
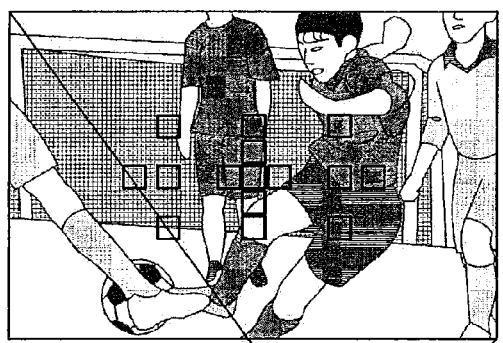
Figure 8:
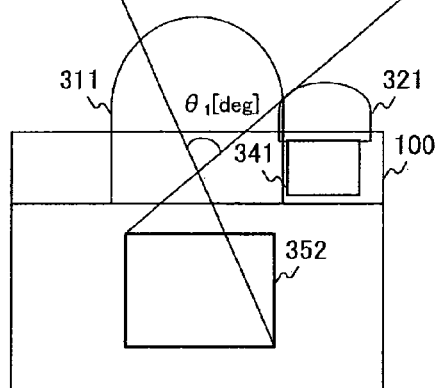
Figure 8:
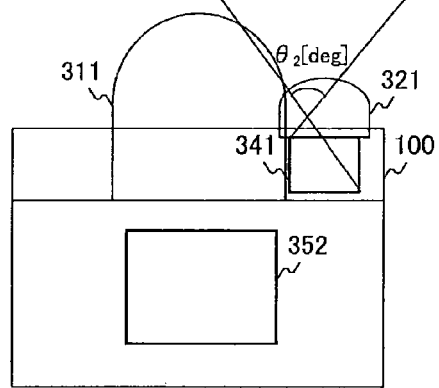

FIG. 8 is a diagram illustrating an example in which the angle of view of the photographing lens 311 coincides with the angle of view of the auxiliary light lens 321. FIG. 8(a) is a diagram illustrating an example of the angle of view of the photographing lens 311. FIG. 8(b) is a diagram illustrating an example of the angle of view of the auxiliary light lens 321. The angle of view of the photographing lens 311 is caused to coincide with the angle of view of the auxiliary light lens 321, so that a range of an image formed on an image area in FIG. 8(a) is equal to a range in which the light emitting section 341 can irradiate auxiliary light in FIG. 8(b). In this way, the angle of view of the photographing lens 311 is caused to coincide with the angle of view of the auxiliary light lens 321, so that the auxiliary light is not irradiated out of an area of an object to be photographed, and thus efficient ranging is possible.

Figure 9:
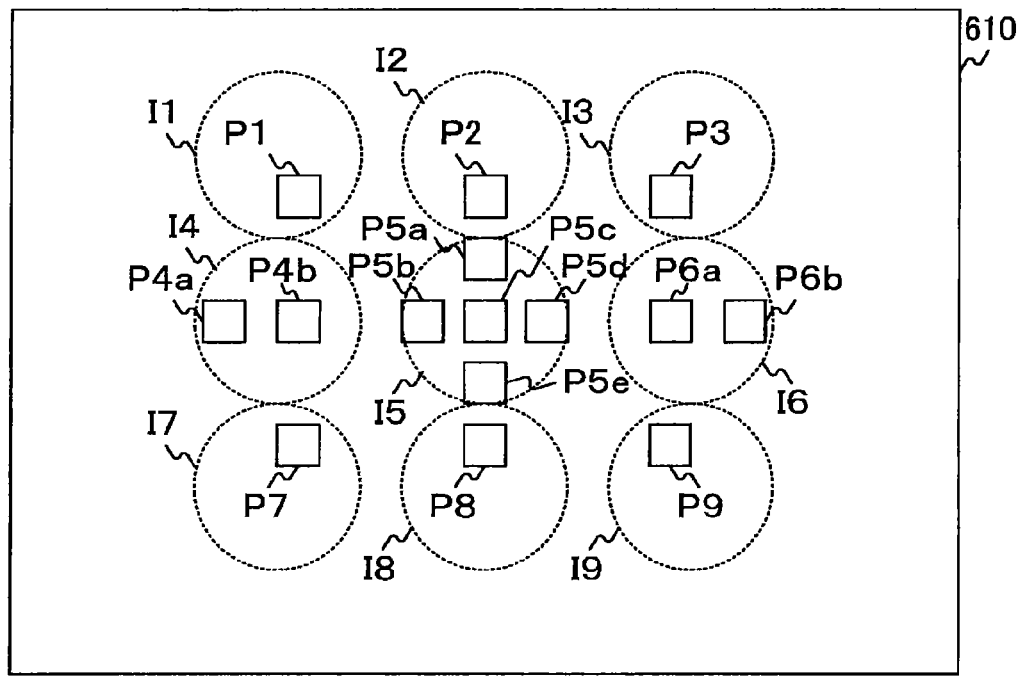
FIG. 9(a) is a diagram illustrating an example of an arrangement of candidate areas preset in a photographing region in a first embodiment.
FIG. 9(b) is a diagram illustrating an example of an arrangement of light emitting bodies arranged in a light emitting section in a first embodiment.
Figure 9:
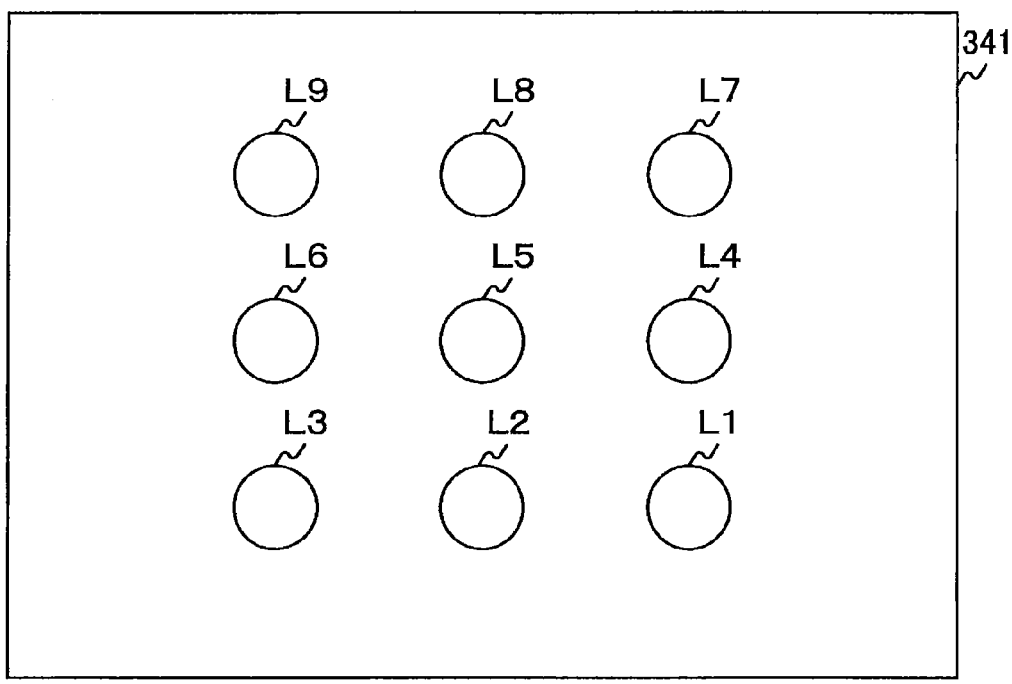

FIG. 9 is a diagram illustrating an example of an arrangement of candidate areas and light emitting bodies in the first embodiment. FIG. 9(a) is a diagram illustrating an example of candidate areas preset in a photographing region 610 projected on a finder. As the candidate areas, for example, 15 areas including P1 to P3, P4a and P4b, P5a to P5e, P6a and P6b, and P7 to P9 are set. In addition, the imaging apparatus 100 may set a predetermined number of candidate areas other than 15.

Meanwhile, FIG. 9(b) is a diagram illustrating an example of light emitting bodies arranged in the light emitting section 341. As illustrated in FIG. 9(b), the light emitting section 341, for example, includes 9 light emitting bodies L1 to L9 arranged therein. Auxiliary light emitted from these light emitting bodies is irradiated onto an object to be photographed through the auxiliary light lens 321. Irradiation regions of the auxiliary light emitted from the light emitting bodies L1 to L9 are set as I1 to I9. As illustrated in FIG. 9(a), the irradiation regions I1 to I3 include the candidate areas P1 to P3, respectively, and the irradiation region I4 includes the candidate areas P4a and P4b. The irradiation region I5 includes the candidate areas P5a to P5e, and the irradiation region I4 includes the candidate areas P4a and P4b. Furthermore, the irradiation region I6 includes the candidate areas P6a and P6b, and the irradiation regions I7 to I9 include the candidate areas P7 to P9, respectively.

The light emitting bodies L1 to L9 are associated in advance with the candidate areas in the irradiation regions of the emitted auxiliary light. For example, the light emitting body L1 is associated with the candidate area P1 in the irradiation region I1 of the emitted auxiliary light. The imaging apparatus 100 causes only a light emitting body corresponding to a candidate area selected as a ranging area to emit auxiliary light. For example, when the candidate areas P1 and P2 are selected, the imaging apparatus 100 causes only the light emitting bodies L1 and L2 to emit auxiliary light.

Figure 10:
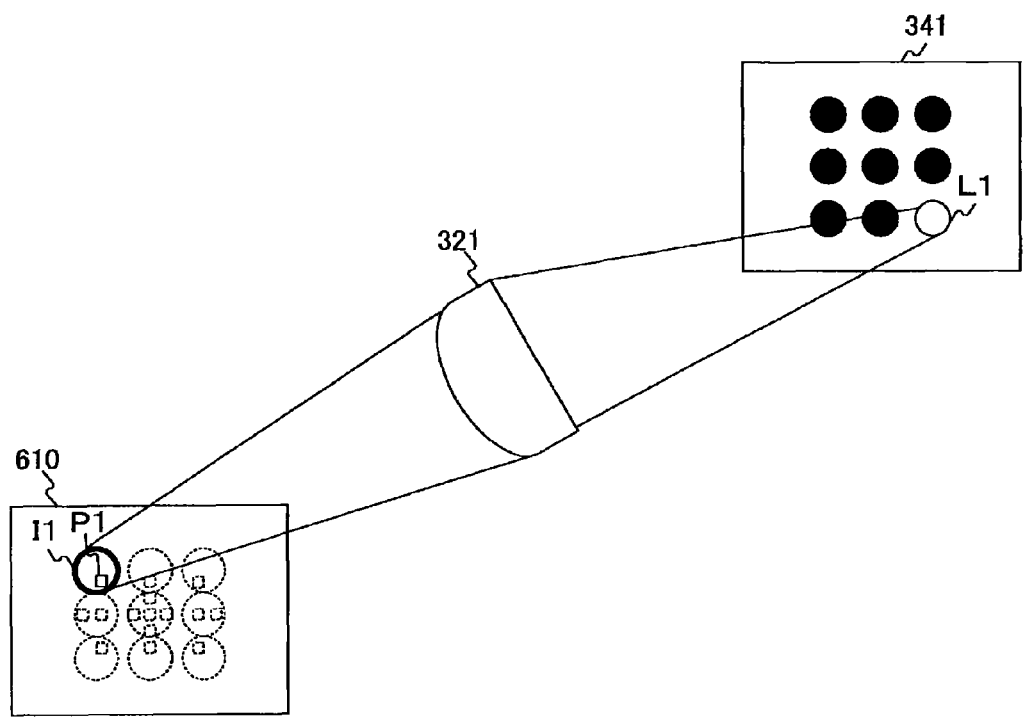
FIG. 10 is a diagram illustrating an example of a relation between a ranging area and a light emitting body in a first embodiment.

FIG. 10 is a diagram illustrating an example of a relation between a ranging area and a light emitting body in the first embodiment. A case in which the candidate area P1 is selected as a ranging area in the photographing region 610 is considered. In this case, the imaging apparatus 100 causes only the light emitting body L1 of the light emitting section 341 corresponding to the candidate area P1 to emit auxiliary light. The auxiliary light from the light emitting body L1 is irradiated onto the irradiation region I1 including the candidate area P1 through the auxiliary light lens 321. In this way, the auxiliary light is irradiated onto only an object to be photographed of a candidate area selected as a ranging area, so that efficient ranging is possible.

Figure 11:
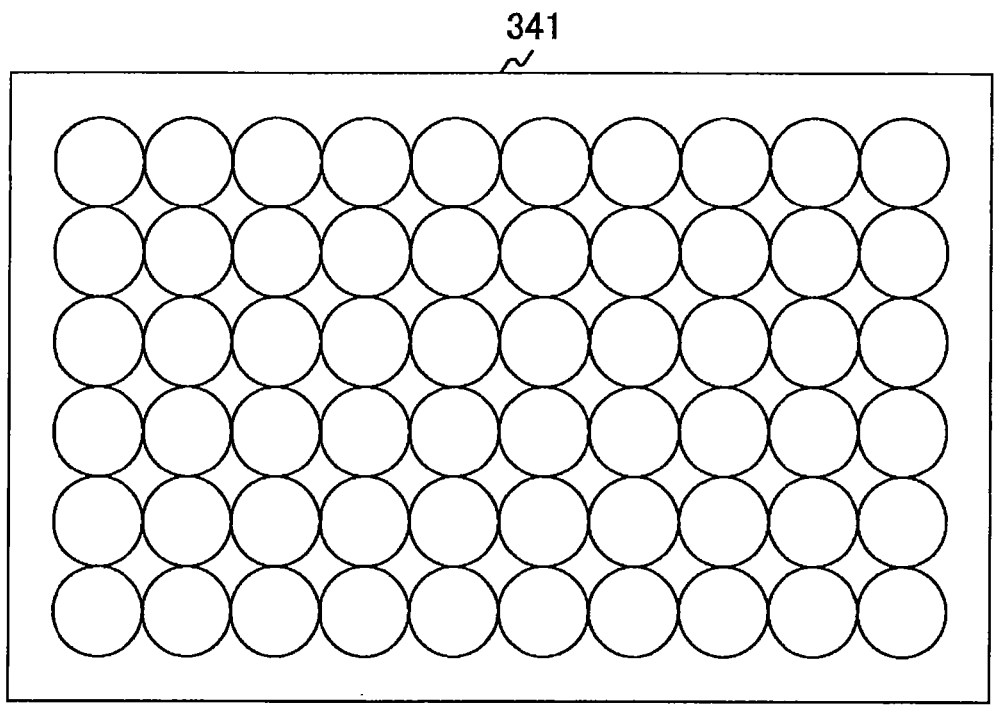
FIG. 11 is a block diagram illustrating a configuration example of a light emitting unit in a first embodiment.

In addition, FIG. 9 and FIG. 10 illustrate a configuration in which the light emitting section 341 includes 9 light emitting bodies. However, the light emitting section 341 may include a predetermined number of light emitting bodies other than 9. For example, as illustrated in FIG. 11, the light emitting section 341 may include 60 light emitting bodies arranged in 6 rows and 10 columns.

[Operation Example of Imaging Apparatus]

Figure 12:
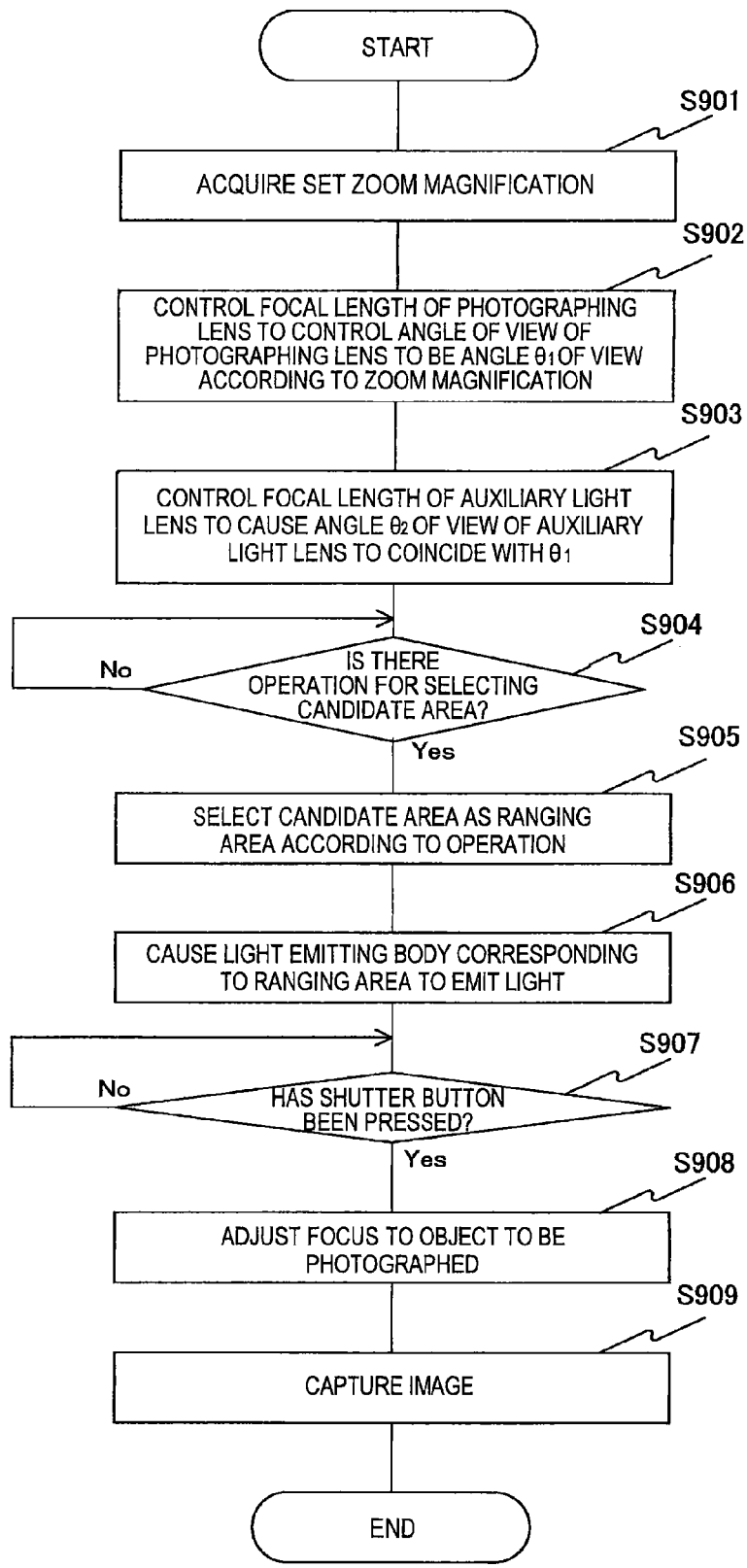
FIG. 12 is a flowchart illustrating an example of an operation of an imaging apparatus in a first embodiment.

FIG. 12 is a flowchart illustrating an example of an operation of the imaging apparatus 100. This operation, for example, starts when the imaging apparatus 100 is powered on. The imaging apparatus 100 acquires a set zoom magnification (step S901). Then, the imaging apparatus 100 controls the focal length of the photographing lens 311, thereby controlling the angle of view of the photographing lens 311 to be an angle $\theta_1$ of view according to the zoom magnification (step S902). The imaging apparatus 100 controls the focal length $f_2$ of the auxiliary light lens 321 based on Equation 11 above, thereby causing the angle $\theta_2$ of view of the auxiliary light lens 321 to coincide with $\theta_1$ (step S903).

Then, the imaging apparatus 100 determines whether there is an operation for selecting a candidate area (step S904). When there is no operation for selecting the candidate area (step S904: No), the imaging apparatus 100 returns to step S904. When there is the operation for selecting the candidate area (step S904: Yes), the imaging apparatus 100 selects the candidate area as a ranging area according to the operation (step S905). Then, the imaging apparatus 100 causes a light emitting body of the light emitting section 341 corresponding to the ranging area to emit auxiliary light (step S906).

The imaging apparatus 100 determines whether the shutter button 101 has been pressed (step S907). When the shutter button 101 has not been pressed (step S907: No), the imaging apparatus 100 returns to step S907. When the shutter button 101 has been pressed (step S907: Yes), the imaging apparatus 100 performs ranging in the ranging area according to half pressing of the shutter button 101, and adjusts a focus to an object to be photographed (step S908). Then, the imaging apparatus 100 captures an image according to full pressing of the shutter button 101 (step S909). After step S909, the imaging apparatus 100 completes the capturing operation.

As described above, according to the first embodiment of the present disclosure, it is possible for the imaging apparatus 100 to select a ranging area from a plurality of candidate areas, irradiate auxiliary light onto only an object to be photographed which is measured in the ranging area, and measure the brightness of the object to be photographed in the ranging area. Consequently, efficient ranging is performed. In detail, the auxiliary light is irradiated onto only the object to be photographed of the ranging area, so that it is possible to reduce power consumption of the imaging apparatus 100. Furthermore, since an irradiation area of the auxiliary light is minimal, illuminance (lumens per square meter) per light amount (lumens·seconds) is improved as compared with the case in which the auxiliary light is irradiated onto an entire photographing area. As a consequence, it is possible to increase a measurable distance per light amount (in other words, power necessary for the output of the light amount).

In addition, the imaging apparatus 100 performs focusing according to the half pressing of the shutter button 101 and performs imaging according to the full pressing thereof. However, the imaging apparatus 100 may perform the focusing and the imaging according to different operations. For example, the imaging apparatus 100 may perform the focusing according to the pressing of the shutter button 101 and perform the imaging when the focusing is completed. Furthermore, an AF button may be provided on the imaging apparatus 100 separately from the shutter button 101, and the imaging apparatus 100 may perform the focusing according to the pressing of the AF button and perform the imaging according to the pressing of the shutter button 101.

[Modification]

Figure 13:
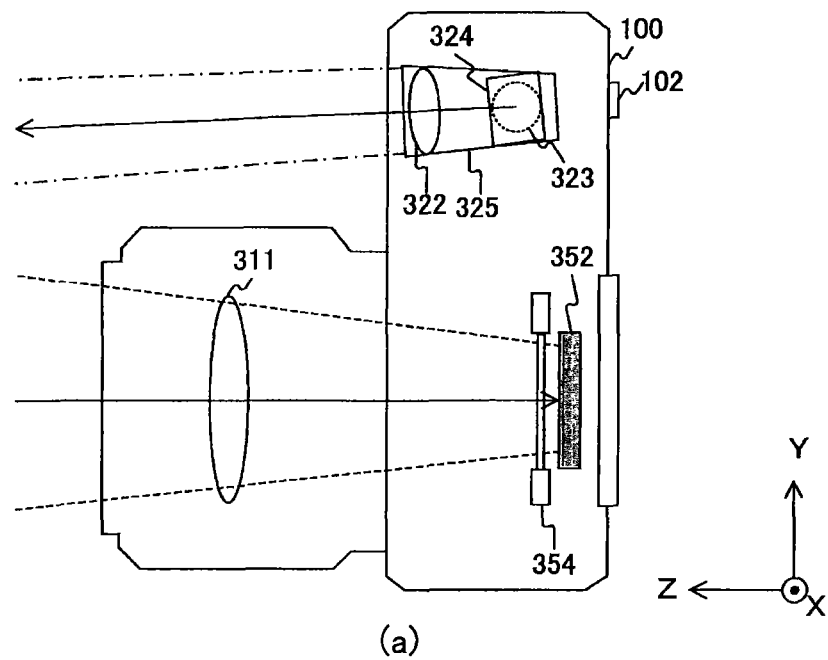
FIG. 13(a) is a diagram illustrating an internal mechanism example of an imaging apparatus of a modification in a first embodiment when viewed from the side.
FIG. 13(b) is a diagram illustrating an internal mechanism example of an imaging apparatus of a modification in a first embodiment when viewed from the top.
Figure 13:
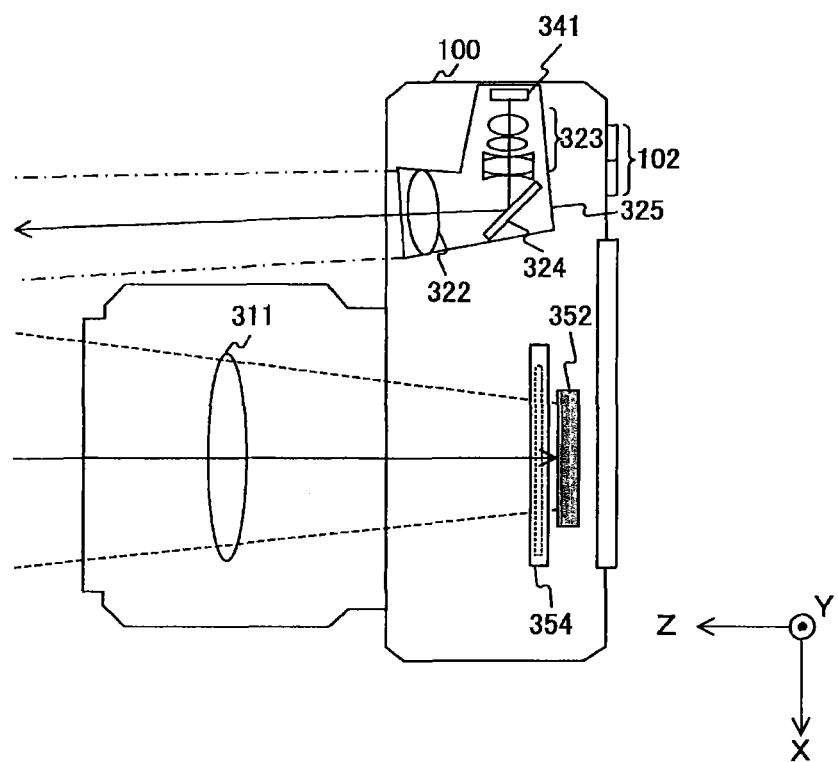

With reference to FIG. 13, an imaging apparatus of a modification in the first embodiment will be described. FIG. 13 is a diagram illustrating an internal mechanism example of an imaging apparatus 100 of the modification in the first embodiment when viewed from the side or the top. The imaging apparatus 100 of the modification is different from that of the first embodiment in that a refractive optical unit is used to refract auxiliary light. FIG. 13(a) is a diagram illustrating an internal mechanism example of the imaging apparatus 100 of the modification when viewed from the side. The imaging apparatus 100 of the modification further includes a reflection unit 324 in a barrel 325 of the auxiliary light lens 321. Furthermore, the auxiliary light lens 321 includes a lens group 322 and a lens group 323. FIG. 13(b) is a diagram illustrating an internal mechanism example of the imaging apparatus 100 of the modification when viewed from the top. Auxiliary light from the light emitting section 341, for example, is irradiated onto the reflection unit 324 through the lens group 323 in the horizontal direction (X axis direction). The reflection unit 324 reflects the irradiated auxiliary light toward the front direction (a z axis direction) of the imaging apparatus 100. The reflected auxiliary light is irradiated onto an object to be photographed through the lens group 322.

As described above, according to the modification, the imaging apparatus 100 refracts the auxiliary light from the light emitting section 341 in the barrel 325 of the auxiliary light lens 321, and irradiates the refracted auxiliary light onto the object to be photographed. Therefore, in the imaging apparatus 100, there is an allowance in the depth as compared with the case in which the auxiliary light is not refracted. Using the allowance of the depth, it is possible to reduce the thickness of the imaging apparatus 100.

2. Second Embodiment

Functional Configuration Example of Control Device

Figure 14:
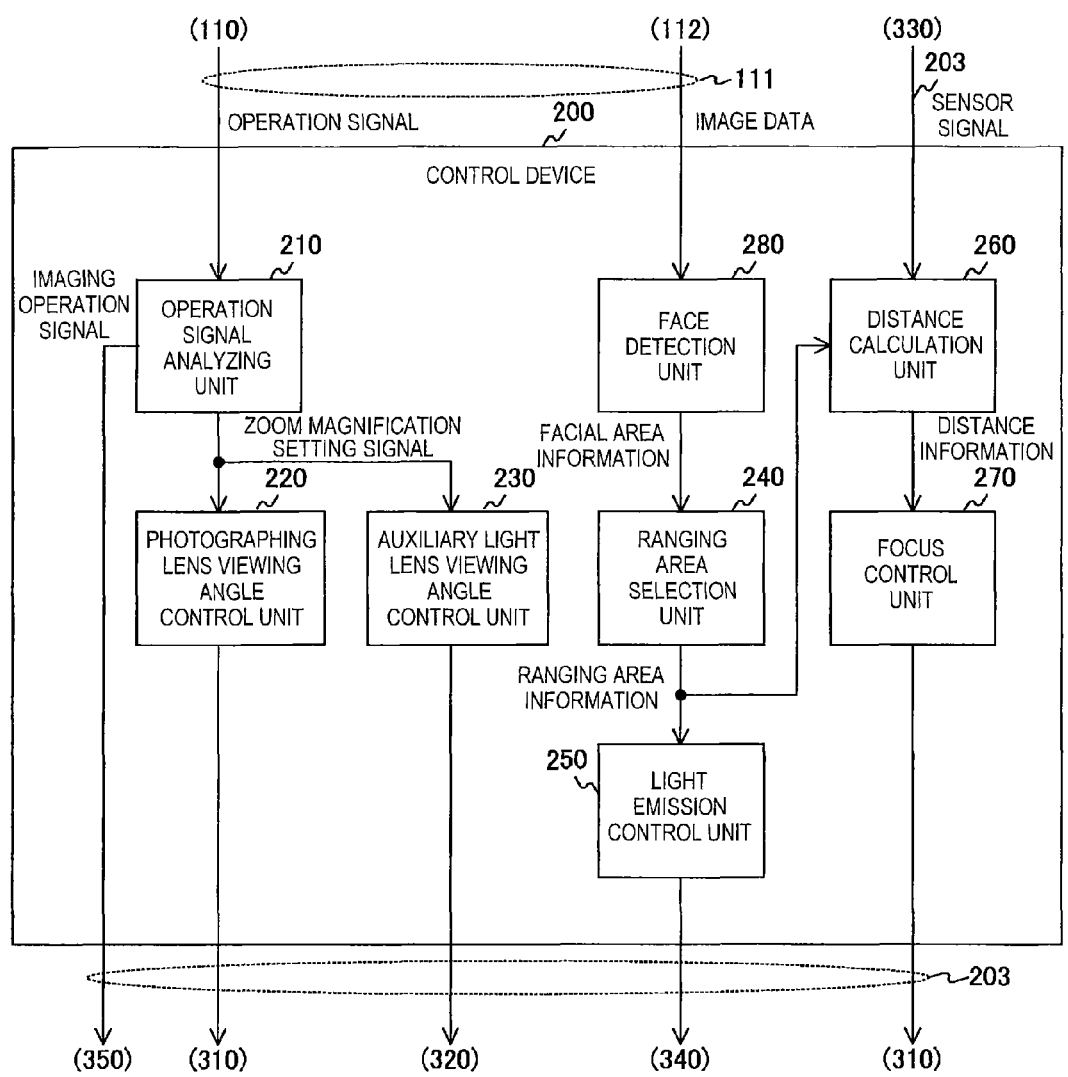
FIG. 14 is a block diagram illustrating a configuration example of a control device in a second embodiment.

Next, with reference to FIG. 14 and FIG. 15, an imaging apparatus 100 of a second embodiment will be described. The imaging apparatus 100 of the second embodiment is different from that of the first embodiment in that a ranging area is automatically set. FIG. 14 is a block diagram illustrating a functional configuration example of a control device 200 of the second embodiment. The control device 200 of the second embodiment is different from that of the first embodiment in that the control device 200 further includes a face detection unit 280. Furthermore, the control device 200 of the second embodiment causes images to be output to the image sensor 352 when the shutter button 101 has been half pressed and fully pressed. The image at the time of half pressing is used for the display on the finder or the automatic setting of a ranging area, and the image at the time of full pressing is used for recording.

The face detection unit 280 detects the face of a person in image data from the signal processing circuit 112. In detail, the face detection unit 280, for example, extracts an area of an object recognized as a face from the color, shape and the like of the object in the image data. Then, the face detection unit 280 performs matching of the area and a template image registered in a database in advance, thereby determining whether the area is a face. The face detection unit 280 outputs coordinate data of a pixel group in the detected facial area to the ranging area selection unit 240 as facial area information. The ranging area selection unit 240 of the second embodiment selects, as a ranging area, a candidate area set in an area in which the face has been detected. In addition, the face detection unit 280 is an example of an object detection unit indicated in the claims. Furthermore, it is possible for the face detection unit 280 to detect a face using a method different from the aforementioned template matching method.

[Operation Example of Imaging Apparatus]

FIG. 15 is a flowchart illustrating an example of an operation of the imaging apparatus 100 of the second embodiment. The operation of the imaging apparatus 100 of the second embodiment is different from that of the first embodiment in that steps S914 and S915 are performed instead of steps S904 and S905. After performing a process for causing the angle of view $\theta_2$ of the auxiliary light lens 321 to coincide with $\theta_1$ (step S903), the imaging apparatus 100 detects a face in the image data (step S914). Then, the imaging apparatus 100 selects a candidate area which has been set in the detected facial area as a ranging area (step S915).

As described above, according to the second embodiment, it is possible for the imaging apparatus 100 to detect a face, and select a candidate area, which has been set in the facial area, as a ranging area. Consequently, it is not necessary for a user to select the ranging area.

In addition, the imaging apparatus 100 detects a face of a person. However, it is possible for the imaging apparatus 100 to detect an object other than the face of the person, and to select a ranging area. The imaging apparatus 100, for example, may detect an animal, a vehicle and the like, and select a ranging area.

Furthermore, the aforementioned embodiment is an example for embodying the present disclosure, and the features of the embodiment have a correspondence relation with the specific features in the scope of the claims. Similarly, the specific features in the scope of the claims have a correspondence relation with the features in the embodiment of the present disclosure having the same name. However, the present disclosure is not limited to the embodiment. For example, of the present disclosure can be embodied through various modifications within the scope of the present disclosure.

Furthermore, the processing procedure described in the aforementioned embodiment may be treated as a method having a series of procedures, or as a program for causing a computer to perform the series of procedures or a recording medium for recording the program. As the recording medium, for example, a CD (Compact Disc), an MD (MiniDisc), a DVD (Digital Versatile Disc), a memory card, a Blu-ray Disc (registered trademark) and the like may be used.

Additionally, the present technology may also be configured as below.

(1) An imaging apparatus including:

a ranging area selection unit configured to select an area for measuring a distance to an object to be photographed from a plurality of candidate areas preset in an area according to an angle of view of a photographing lens, the area being selected as a ranging area;

an irradiation unit configured to irradiate auxiliary light onto the object to be photographed, a distance to the object to be photographed being measured in the ranging area; and a ranging unit configured to measure the distance to the object to be photographed, to which the auxiliary light has been irradiated, in the ranging area.

(2) The imaging apparatus according to (1), further including:
an auxiliary light lens viewing angle control unit configured to control an angle of view of an auxiliary light lens for irradiating the auxiliary light, and to cause the angle of view of the auxiliary light lens to coincide with an angle of view of the photographing lens.

(3) The imaging apparatus according to (2), wherein the auxiliary light lens viewing angle control unit adjusts a focal length of the auxiliary light lens such that a ratio of a size of an area in which the auxiliary light is generated to a size of an area of a photographing pixel is equal to a ratio of the focal length of the auxiliary light lens to a focal length of the photographing lens, thereby causing the angle of view of the auxiliary light lens to coincide with the angle of view of the photographing lens.

(4) The imaging apparatus according to (3), wherein the irradiation unit includes:
a light emitting section configured to generate the auxiliary light through light emission of a plurality of light emitting bodies associated with the plurality of candidate areas; and
a light emission control section configured to cause a light emitting body corresponding to the selected candidate area among the plurality of light emitting bodies to emit light.

(5) The imaging apparatus according to (4), wherein the irradiation unit refracts the auxiliary light from the light emitting section in a barrel of the auxiliary light lens, and irradiates the refracted light onto the object to be photographed.

(6) The imaging apparatus according to any of (1) to (5), further including:
a focusing control unit configured to adjust a focus to the measured distance.

(7) The imaging apparatus according to any of (1) to (6), further including:
an object detection unit configured to detect a predetermined object in an area according to the angle of view of the photographing lens,
wherein the ranging area selection unit selects, as the ranging area, a candidate area set in an area in which the object has been detected from the plurality of candidate areas.

(8) A control method of an imaging apparatus, including:
selecting, by a ranging area selection unit, an area for measuring a distance to an object to be photographed from a plurality of candidate areas preset in an area according to an angle of view of a photographing lens, the area being selected as a ranging area;
irradiating, by an irradiation unit, auxiliary light onto the object to be photographed, the distance to the object to be photographed being measured in the ranging area; and
measuring, by a ranging unit, the distance to the object to be photographed, to which the auxiliary light has been irradiated, in the ranging area.

The present disclosure contains subject matter related to that disclosed in Japanese Priority Patent Application JP 2011-206817 filed in the Japan Patent Office on Sep. 22, 2011, the entire content of which is hereby incorporated by reference.

What is claimed is:

1. An imaging apparatus, comprising:
ranging area selection circuitry configured to select a ranging area for measuring a distance to an object to be photographed from a plurality of candidate areas, the plurality of candidate areas being preset in a photographing area according to an angle of view of a photographing lens;
irradiation circuitry configured to radiate auxiliary light onto the object to be photographed, wherein the irradiation circuitry comprises:
light emission control circuitry configured to cause a light emitting body among a plurality of light emitting bodies, corresponding to a selected candidate area of the plurality of candidate areas, to emit light onto one of a plurality of non-overlapping irradiation regions,
wherein a number of candidate areas among the plurality of candidate areas in one of the plurality of non-overlapping irradiation regions is set to be different from the number of candidate areas in other of the plurality of non-overlapping irradiation regions;
ranging circuitry configured to measure the distance to the object to be photographed, to which the auxiliary light has been irradiated, in the ranging area; and
auxiliary light lens viewing angle control circuitry configured to:
control an angle of view of an auxiliary light lens for irradiating the auxiliary light, and
cause the angle of view of the auxiliary light lens to coincide with the angle of view of the photographing lens.

2. The imaging apparatus according to claim 1, wherein the irradiation circuitry refracts the auxiliary light from a light emitting circuitry in a barrel of the auxiliary light lens, and irradiates the refracted light onto the object to be photographed.

3. The imaging apparatus according to claim 1, further comprising focusing control circuitry configured to adjust a focus to the measured distance.

4. The imaging apparatus according to claim 1, further comprising:
object detection circuitry configured to detect a predetermined object in the photographing area according to the angle of view of the photographing lens,
wherein the ranging area selection circuitry selects, as the ranging area, a candidate area set in an area in which the predetermined object has been detected from the plurality of candidate areas.

5. The imaging apparatus according to claim 1, wherein the ranging circuitry comprises one or more of: a photometric sensor or distance calculation circuitry.

6. A control method of an imaging apparatus, comprising:
selecting, using ranging area selection circuitry, a ranging area for measuring a distance to an object to be photographed from a plurality of candidate areas, the plurality of candidate areas being preset in a photographing area according to an angle of view of a photographing lens;
irradiating, using irradiation circuitry, auxiliary light onto the object to be photographed, wherein the irradiating comprises:
causing, using light emission control circuitry, a light emitting body among the plurality of light emitting bodies, corresponding to a selected candidate area of the plurality of candidate areas, to emit light onto one of a plurality of non-overlapping irradiation regions,
wherein a number of candidate areas among the plurality of candidate areas in one of the plurality of non-overlapping irradiation regions is set to be different from the number of candidate areas in other of the plurality of non-overlapping irradiation regions;
measuring, using ranging circuitry, the distance to the object to be photographed, to which the auxiliary light has been irradiated, in the ranging area;

controlling, using auxiliary light lens viewing angle control circuitry, an angle of view of an auxiliary light lens for irradiating the auxiliary light; and causing, using the auxiliary light lens viewing angle control circuitry, the angle of view of the auxiliary light lens to coincide with the angle of view of the photographing lens.

7. An imaging apparatus, comprising:

a photographing lens;

an auxiliary lens;

ranging area selection circuitry configured to select a ranging area for measuring a distance to an object to be photographed from a plurality of candidate areas, the plurality of candidate areas being preset in a photographing area according to an angle of view of the photographing lens;

a first plurality of light emitting bodies configured to emit auxiliary light;

irradiation circuitry configured to irradiate the auxiliary light onto the object to be photographed, wherein the irradiation circuitry comprises:

light emitting circuitry configured to generate the auxiliary light through light emission of a second plurality of light emitting bodies associated with the plurality of candidate areas, the second plurality of light emitting bodies being less than the first plurality of light emitting bodies; and light emission control circuitry configured to cause a light emitting body among the second plurality of light emitting bodies, corresponding to a selected candidate area of the plurality of candidate areas, to emit light onto one of a plurality of non-overlapping irradiation regions, wherein a number of candidate areas among the plurality of candidate areas in one of the plurality of non-overlapping irradiation regions is set to be different from the number of candidate areas in other of the plurality of non-overlapping irradiation regions;

ranging circuitry configured to measure the distance to the object to be photographed, to which the auxiliary light has been irradiated, in the ranging area; and auxiliary light lens viewing angle control circuitry configured to:

control an angle of view of the auxiliary light lens for radiating the auxiliary light, and cause the angle of view of the auxiliary light lens to coincide with the angle of view of the photographing lens.

8. The imaging apparatus according to claim 1, further comprising a distance calculation unit configured to calculate the distance to the object to be photographed from a phase difference of light quantity distribution of two images separated by a separator lens.

9. The control method according to claim 6, further comprising extracting a photometric value in the ranging area from a plurality of photometric values, and performing a predetermined operation on the extracted photometric value, thereby calculating the distance to the object to be photographed.

10. The imaging apparatus according to claim 1, wherein the auxiliary light lens viewing angle control circuitry is configured to adjust a focal length of the auxiliary light lens such that a ratio of a size of a portion of the photographing area where the auxiliary light is generated to a size of an image area on an image sensor is equal to a ratio of the focal length of the auxiliary light lens to a focal length of the photographing lens.

11. The imaging apparatus according to claim 1, further comprising a photographing lens viewing angle control unit configured to cause a focal length of the photographing lens to coincide with a value obtained by multiplying a shortest focal length in a range of the photographing lens by a zoom magnification to control the angle of view.

12. The imaging apparatus according to claim 11, wherein the photographing lens viewing angle control unit is configured to maintain a focused state based on controlling a position of a focus lens of the photographing lens along a zoom tracking curve, the zoom tracking curve indicating a relation between the focal length of the photographing lens and the position of the focus lens in the focused state.

* * * * *